United States Patent [19]
Amendolia

[11] Patent Number: 5,389,771
[45] Date of Patent: Feb. 14, 1995

[54] BARCODING

[76] Inventor: Pasquale J. Amendolia, P.O. Box 475, St. James, N.Y. 11780

[21] Appl. No.: 162,567

[22] Filed: Dec. 7, 1993

[51] Int. Cl.⁶ .................................................. G06K 7/10
[52] U.S. Cl. ................................... 235/454; 235/375; 235/462
[58] Field of Search ........................ 235/375, 454, 462

[56] References Cited

U.S. PATENT DOCUMENTS

| | | | |
|---|---|---|---|
| 4,857,716 | 8/1989 | Gombrich et al. | 235/462 |
| 5,229,585 | 6/1993 | Lamberger et al. | 235/375 |

*Primary Examiner*—Harold Pitts
*Attorney, Agent, or Firm*—Leonard Belkin

[57] ABSTRACT

Apparatus for imprinting patient or subject identifying information in the form of a barcode on unexposed X-ray film employing a light and lens system utilizing a negative LCD to cast the shadow for exposure on the film. The light and lens system employs a point light source and a light path which is extended by folding the path and using mirrors. A double convex lens is employed in one embodiment at the end of the light path to direct the light through the transparent LCD containing the information in barcode form.

11 Claims, 4 Drawing Sheets

BARCODING

BACKGROUND OF THE INVENTION

This invention is an improvement of my invention in application Ser. No. 07/862,800 filed jointly On Apr. 3, 1992 for "System for Imprinting Patient-Identifying Barcodes Onto Medical X-rays", now U.S. Pat. No. 5,288,977.

The present invention relates to the barcoding of x-ray and similar film with sufficient clarity to eliminate or minimize the risk that an error in identification will result.

Present methods of placing identification on x-ray films includes the common method of using a paper or card "negative" through which light is passed creating the image of the paper containing the typewritten information on the film. This method requires that the card or paper be in direct contact with the film and the entire procedure be done in a darkroom because the film must be removed from the x-ray cassette. Another, more sophisticated method involves using the same basic paper or card method in an opaque projector which optically focuses the image on the film within the cassette through a "window" opening in the cassette. This method can be used outside the darkroom and also in the darkroom directly on the film, if necessary.

Newer devices, known as ID cameras, such as Kodak's unit, incorporate a LCD device which adds the time and date to the other information. These LCD's are similar to those used on watches, etc. They are opaque and read the way a camera reads, that is, from one side and are used within the opaque projector device just as the opaque paper or card is used.

Although it may be possible to place a barcode on the film using the paper system, the barcode would have to be first printed on the paper, then the paper would be used in the same way as the current placing of alphanumeric characters on the film. It might also be possible to place the barcode on the LCD and then project this image on the film with the opaque projector. There are some difficulties with this because where the device might be good enough for characters to be read by eye, the barcode image must be accurate and well defined for it to be readable. The cost of the optics to do this is much greater than using the simple system I have devised.

In our earlier applications there is described a system for marking x-ray film with a barcode which is formed by an LCD and projected directly onto the film.

In order for the barcode to appear on the x-ray film sufficiently sharp and clear to avoid errors in reading the code, it is necessary that the LCD be mounted very close to the film.

If a collimated light source were projected through the LCD, the image cast on the film would theoretically be sharp at any distance from the LCD although, from a practical point of view, there are limitations which prevent using large distances. Also, providing a collimated light source involves the use of complex lens systems involving significantly higher costs and greater space requirements.

SUMMARY OF THE INVENTION

In this invention, almost collimated light in a barcoding system is employed with a negative or transparent LCD to produce a readable barcode without a complex optical system.

By "almost collimated" light herein is meant light which is sufficiently collimated so that the shadow cast on the x-ray film by the transparent LCD containing the barcode is readable even though the LCD and film may not be in contact or near contact with each other as described below.

A barcode is generated on the transparent LCD much like a photographic negative and a compact, simplified lens system is provided to produce an "almost collimated" light source which makes it unnecessary to locate the LCD within a distance no greater than $\frac{3}{8}''$. In fact, in this invention, the x-ray film can be even up to several inches away from the LCD, to project the barcode on the x-ray film with sufficient clarity to insure accurate reading by equipment currently available, making the present invention convenient and economic to use.

The lens system employed in this invention is a practical and efficient arrangement which is so effective it could also be used to project a photographic film image from a negative to a printing paper without the use of the normal system of lenses used in enlargers and other film printing systems.

It is thus a principal object of this invention to provide an improved way of projecting a barcode on an x-ray film in a system designed to insure that errors in identification will not occur.

Other objects and advantages of this invention will hereinafter become obvious from the following description of preferred embodiments of this invention.

DESCRIPTION OF THE PREFERRED EMBODIMENTS

Figure 1:
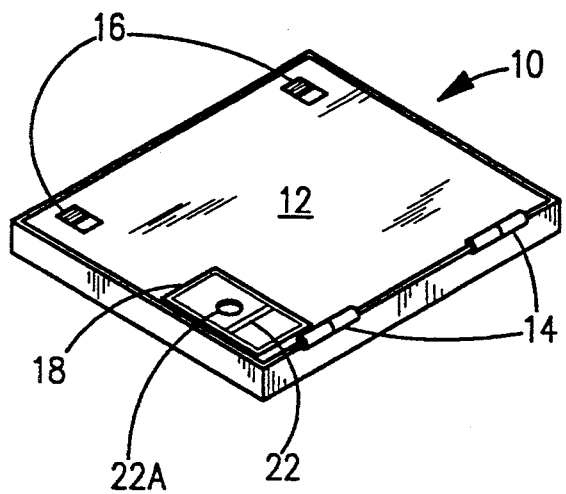
FIG. 1 is an isometric view of an X-ray film cassette now commonly in use.
Figure 2:
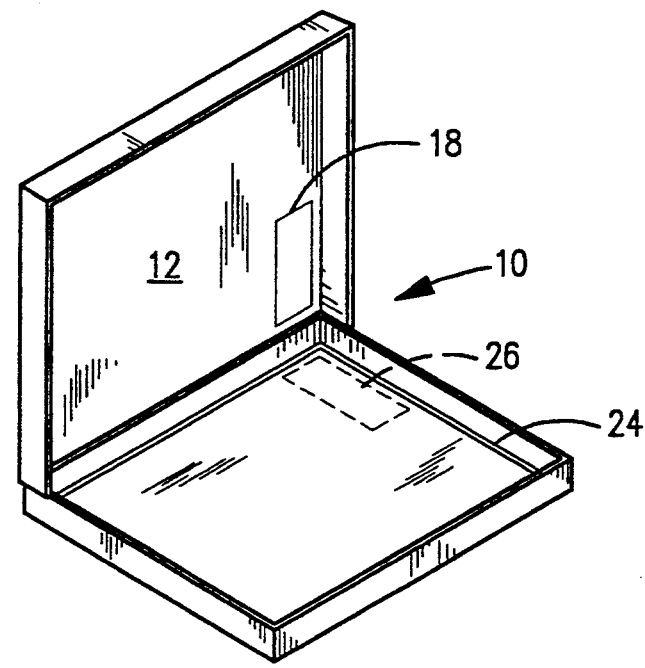
FIG. 2 is an isometric view of the cassette shown in FIG. 1 in an open position.

Referring to FIGS. 1 and 2, there is illustrated a typical X-ray film cassette 10 with a cover 12 hinged at 14 with latches 16 for either locking or permitting cover 12 to be opened. In one corner of cassette 10 is located in cover 12 an opening or window 18 with a sliding panel or door 22 shown in a partially open condition. Panel 22 is has a depression 22a to accommodate the end of a finger or a tool to move panel 22 between open and closed positions.

Enclosed in cassette 10 is a sheet 24 of X-ray film and a strip 26 of lead shielding under film 24 opposite window 18 when cover 12 is closed. The underside of cassette 10 which is not visible is made from a material opaque to light but transparent to X-rays. The other side of cassette 10 may have appropriate shielding.

In one current way to use cassette 10, latches 16 are released to open cover 12 and a sheet of unexposed X-ray film is inserted (in the dark), then cover 12 is closed. To place patient or other subject identifying material on the film, the latter would be exposed to the information prior to insertion or after removal of the film (in the dark).

As noted earlier, the Kodak ID camera may be employed to expose the film to patient or other subject identifying information with the film in the cassette.

Cassette 10 is then inserted into the X-ray machine where the patient or subject is irradiated producing the desired image on the film. The identifying material may be placed on the X-ray film before, during or after patient or subject exposure, depending on available technology.

In the present invention an improved way of placing the patient or other subject identifying information on the X-ray film is provided.

Figure 3:
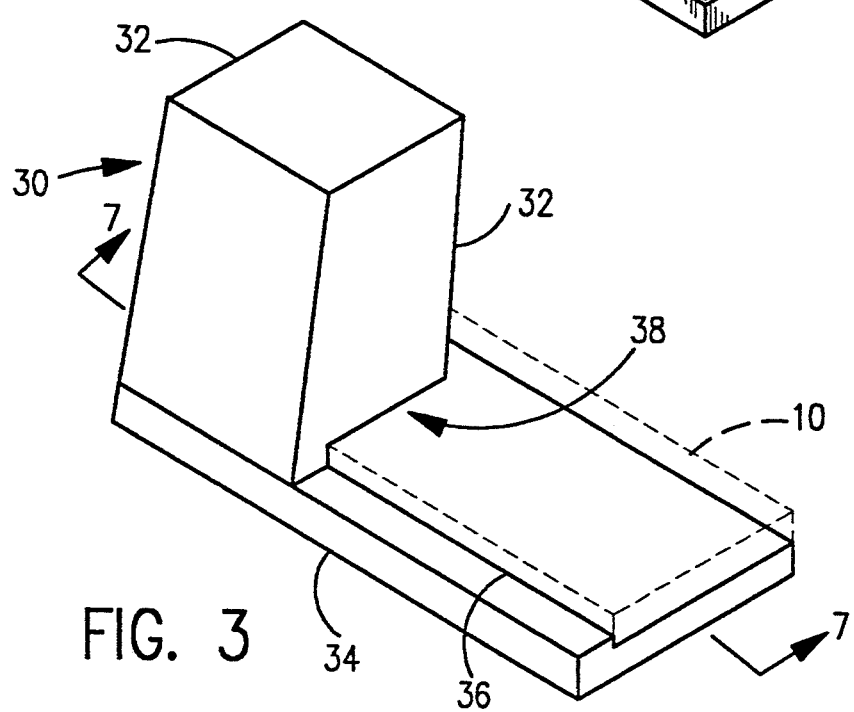
FIG. 3 is a perspective view of a preferred embodiment of this invention with the cassette shown mounted in phantom.
Figure 4:
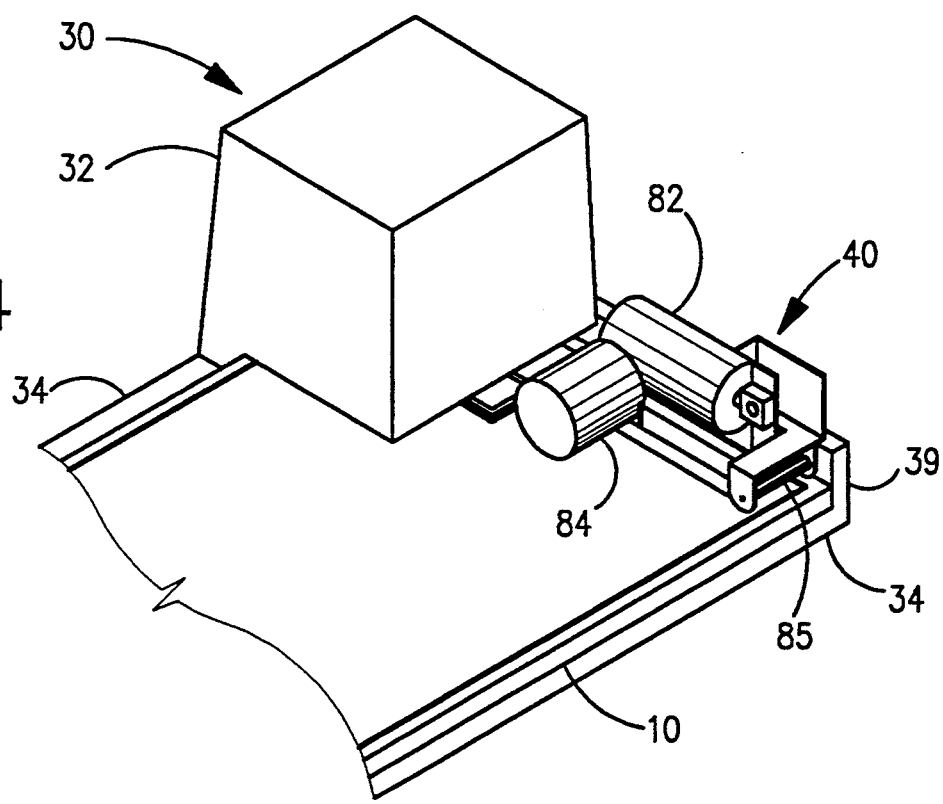
FIG. 4 is a view of the apparatus shown in FIG. 3 taken from the right hand side.

Referring to FIGS. 3 and 4, optics module 30 incorporating the principles of this invention comprises a housing 32 mounted on a base 34 with a shoulder 36 along one side of base 34 and an opening 38 into which cassette 10 is inserted as illustrated for a purpose to be described. Located behind housing 32 is another shoulder 39 to provide a stop for cassette 10 as well as some alignment switches (not shown) to make sure the device to open window 18 is not actuated unless cassette 10 is properly positioned.

Also mounted on base 34 is the window actuating mechanism 40 which will be further described below.

Figure 5:
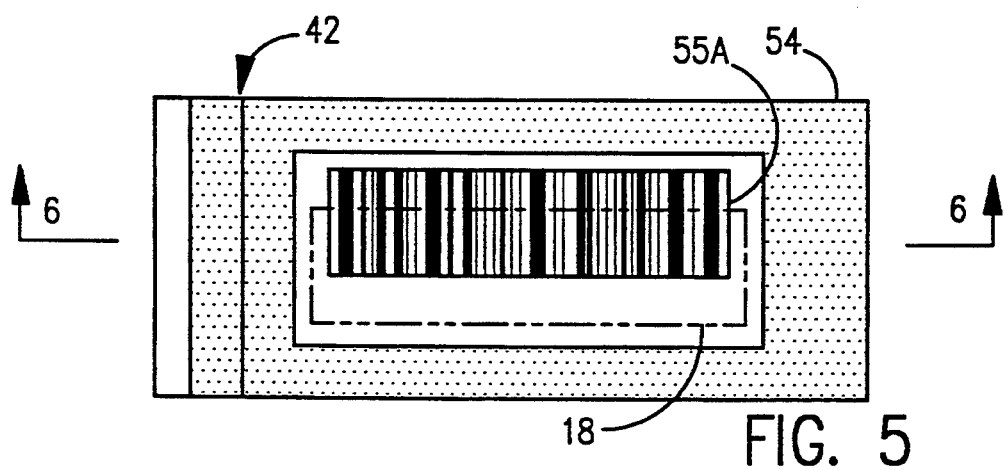
FIG. 5 is a plan view of the LCD assembly.
Figure 6:
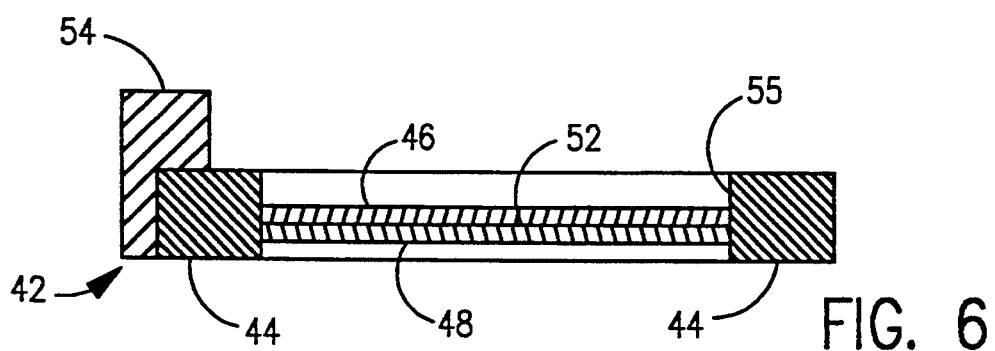
FIG. 6 is a section taken along 6—6 of FIG. 5.
Figure 7:
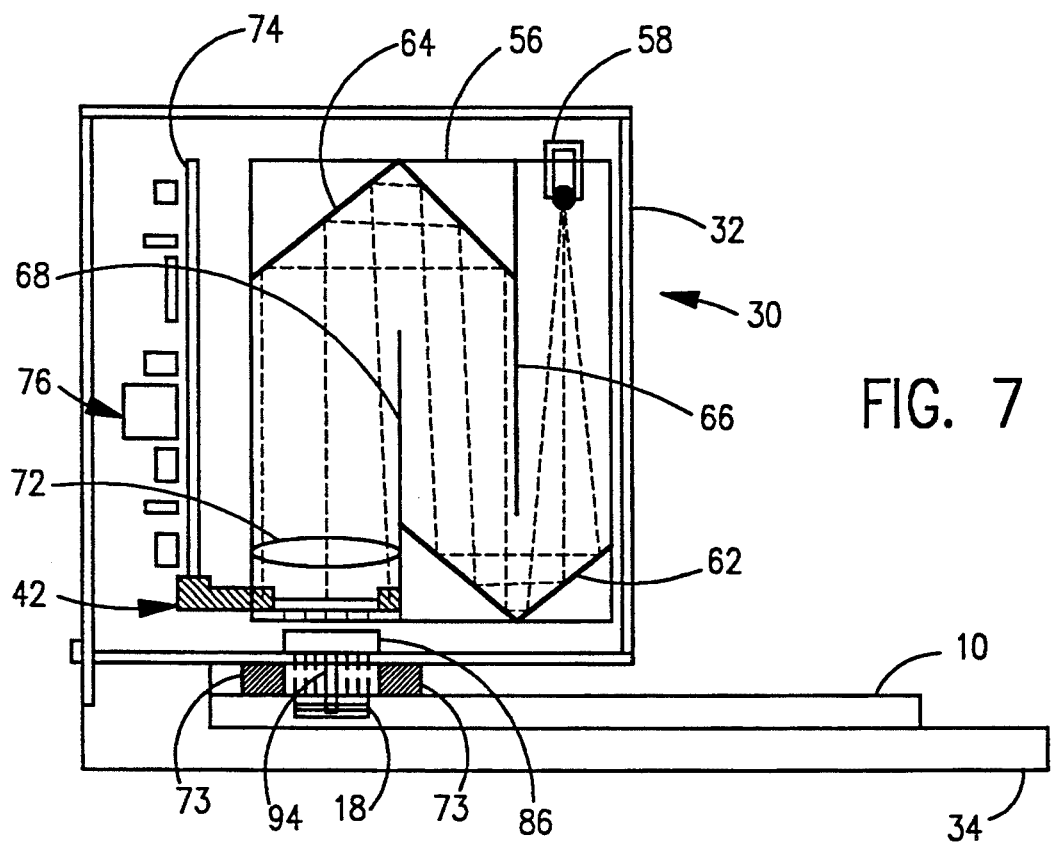
FIG. 7 is a section view, partially schematic, taken along 7—7 of FIG. 3.
Figure 8:
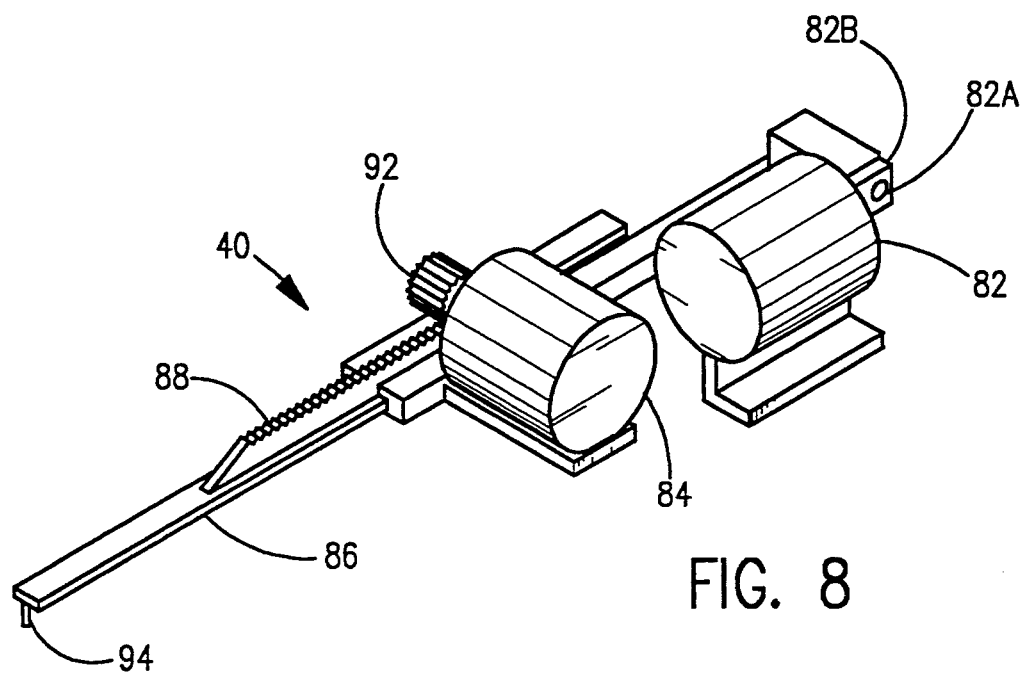
FIG. 8 is a perspective and partially schematic view of the cassette window opening mechanism partially illustrated in FIG. 4.

Referring also to FIGS. 5-7, module 30 consists of a housing 32 on the bottom of which is mounted an LCD assembly 42. As seen in FIGS. 5 and 6, LCD assembly 42 consists of two sheets 46 and 48 of transparent glass or plastic forming a sandwich with the liquid crystal layer 52 therebetween surrounded by a frame 44 of opaque material forming window 55. Member 54 attached to frame 44 may house electronic components (not shown). Liquid crystal layer 52 is made up of individual segments as is understood in the art.

Window 55 is shown transparent with barcode 55a formed in layer 52 opaque and overlapping the cassette window opening 18 shown in phantom to allow for misalignments. Under barcode 55a is left room for other patient or subject identifying information such as the subject's name or title, if desired.

When a bar code and/or other identifying information is to be displayed, the segments affected will be made to be opaque by either energizing or deenergizing the proper segments, thereby blocking any light passing therethrough and acting as a "negative" to use photographic terminology. The details of the LCD which may be employed do not form a part of this invention.

Referring to FIG. 7, within housing 32 is located a light housing 56 in which is mounted a point light source 58, a pair of rectangular mirror assemblies 62 and 64, and separators 66 and 68 to extend the light path from light source 58 to a single double convex lens 72 located just above LCD assembly 42. The latter is situated as illustrated so that the beam of light emanating from light source 58 passes through lens 72 and transparent window 55 containing liquid crystal layer 52. The arrangement just described in effect folds up an extended light path into a compact space. The extended light path reduces the angle of divergence of the light at the end of the light path.

Lens 72 is a double convex lens with a long focal length equal to the distance from lens 72 to light source 58. The light rays passing through lens 72 are almost collimated as they pass through LCD assembly 42 causing a shadow formed from the bar code displayed in assembly 42 to appear on and expose the film within cassette 10.

The use of lens 72 shortens the distance between light source 58 and assembly 42 necessary to provide sufficient collimation to produce a bar code image on the film sharp enough to be read.

A perfectly collimated light source would require an elaborate and relatively expensive lens system. The present system produces light which is sufficiently collimated that an adequate barcode can be produced on the film up to several inches away from the LCD.

It will be noted that cassette window 18 is located directly under LCD assembly 42 so that when door 22 is open the film contained within cassette 10 will be exposed to the bar code formed within transparent window of LCD assembly 42. Light sealing member 73 surrounding window 18 prevents the entry of any undesirable light.

The liquid crystal display acts in the present invention like a photographic negative in that the display produced is a reversal of the form as it will appear on the film after the latter is developed.

Mounted on a board 74 adjacent LCD assembly 42 is electronic circuitry 76 of conventional design not forming a part of this invention to energize the liquid crystal display (LCD) just described and provide the sequence of operation of window opening mechanism 40.

For details of window opening mechanism 40, reference is made to FIGS. 8, 9A, 9B, and 9C. Mechanism 40 comprises a solenoid 82 with pin 82A on core 82B connected to arm 86A, an electric motor 84, and a slidable arm 86 on which is mounted a toothed rack 88 which is engaged by a pinion 92 driven by motor 84. Mechanism 40 is pivoted on a pin 85 at one end attached to shoulder 39 of base 34.

Figure 9A:
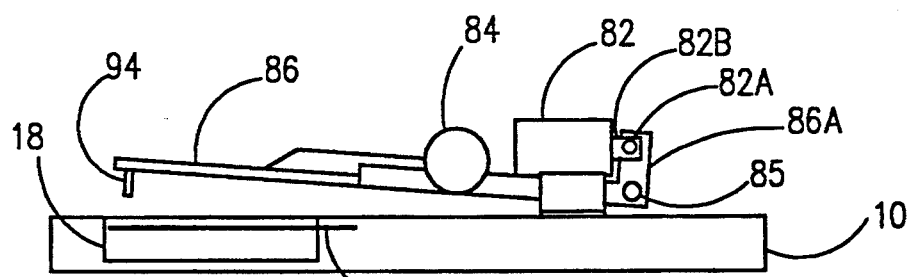
FIG. 9A is a perspective and schematic view of the window opening mechanism in its at rest position.
Figure 9B:
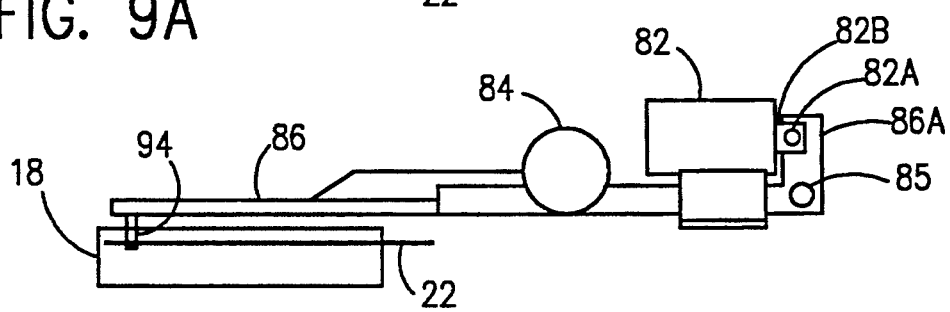
FIG. 9B shows the mechanism of FIG. 9A engaged with the cassette window door.
Figure 9C:
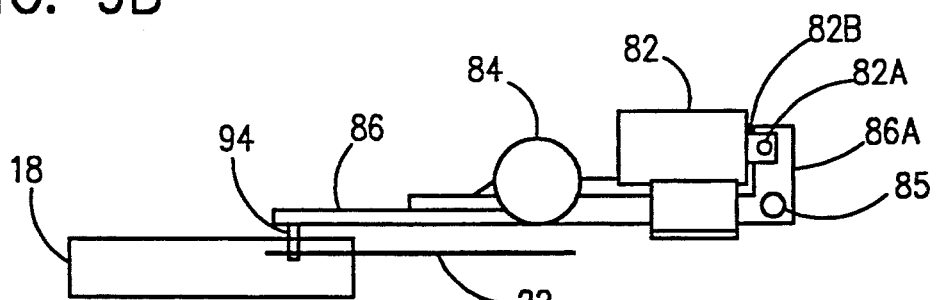
FIG. 9C shows the mechanism of FIG. 9A engaged with the cassette window door open.

The distal end of arm 86 is provided with a downwardly extending pin 94. At rest, arm 86 and pin 94 are in the raised (default) position as illustrated in FIG. 9A, with pin 94 away from cassette 10 to allow sufficient clearance for the latter to be inserted into base 34 under housing 32. Upon energization of solenoid 82, core 82B and pin 82A connected to vertically extending arm 86A is retracted a short distance thereby dropping pin 94 into recess 22A of door 22. Then, upon energization of electric motor 84, the latter drives pinion 92 to retract arm 86 resulting in the opening of door 22 as shown in FIG. 9C. Then the film within cassette 10 is exposed by light passing through LCD assembly 42 by energizing light source 58. After imprint of the barcode on the X-ray film motor 84 would be energized again to extend arm 86 to close door 22, and solenoid deenergized to raise pin 94.

In the use of the present invention, cassette 10 would be inserted into base 34 as shown in FIG. 3, LCD assembly 42 would be energized, mechanism 40 actuated to open door 22, light source 58 would be briefly energized to imprint the barcode on the film, and mechanism 40 actuated to close cassette window 18. The whole procedure may be conducted manually or automated in a manner known in the art.

Figure 10:
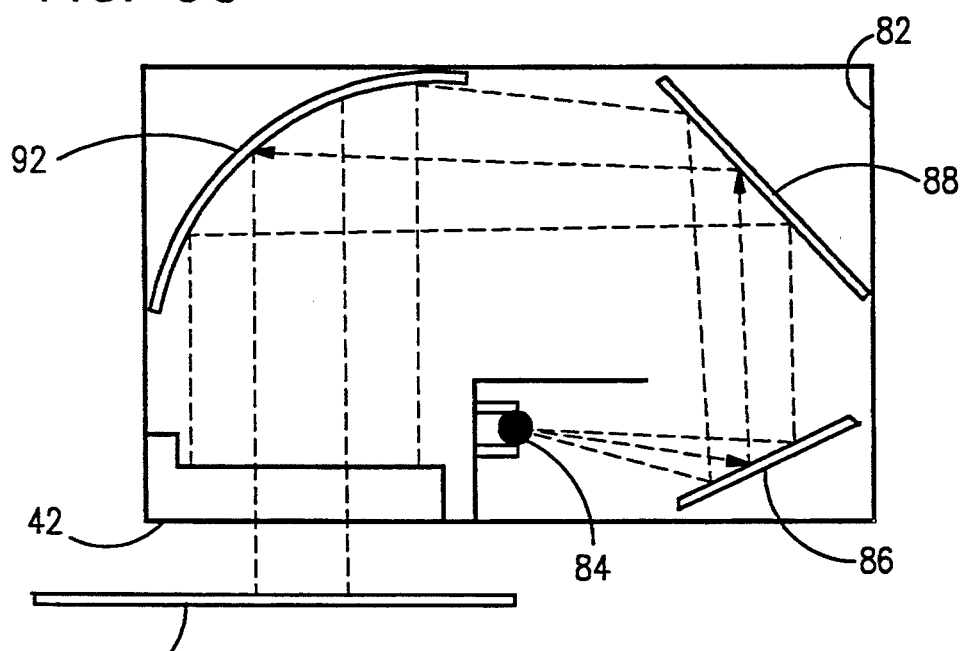
FIG. 10 is a schematic illustration of an alternative embodiment of this invention.

FIG. 10 illustrates an alternative embodiment in which light housing 82' contains a point light source 84 producing light rays directed by flat mirrors 86 and 88 to a parabolic mirror 92 which produces sufficiently collimated light rays directed through LCD assembly 42 containing the "negative" to film 24 where a readable barcode image is produced. Light source 84 is located at the effective focal point for parabolic mirror 92.

The advantage of this arrangement is that it avoids use of a lens completely and is less costly to manufacture.

The invention as described herein is a unique and improved way of imprinting an identifying barcode on an X-ray film using an LCD without the necessity of utilizing an elaborate lens system to insure readability of the code on the film by commercial reading instruments.

While only certain preferred embodiments of this invention have been described, it is understood that many variations of this invention are possible without departing from the principles of this invention as defined in the claims which follow.

What is claimed is:

1. A subject identification system comprising cassette means for containing unexposed X-ray film for receiving X-ray irradiation passing through said subject, said cassette means having an open window through which subject identifying information may be transferred to said film, said open window being provided with a slidable door movable between a first position opening said window and a second position closing said window, base means for receiving said cassette means, means mounted on said base means for delivering subject identifying information to said film in said cassette means through said window when said slidable door is in its first position, said mounted means containing a source of light, means for rendering said light almost collimated, LCD means located in the path of said almost collimated light to project an image on said x-ray film, said LCD means upon energization producing subject identifying information in the form of a negative so that when said almost collimated light passes through said LCD means said subject identifying information appears on said film in a readable form after being developed.

2. The subject identification system of claim 1 wherein said LCD means produces upon energization a barcode to be projected onto said X-ray film.

3. The subject identification system of claim 2 in which said means for producing almost collimated light comprises an uncollimated source of light and a light path to said LCD means which is elongated by the use of mirrors to fold said path into a compact space.

4. The subject identification system of claim 3 in which said means for producing almost collimated light includes a single lens located at the end of said light path to direct the light through said LCD means.

5. The subject identification system of claim 4 wherein said single lens is a double convex lens.

6. The subject identification system of claim 3 in which said means for producing almost collimated light includes a parabolic mirror.

7. A method for imprinting subject identifying information on X-ray film within a cassette having a window through which said information is delivered to said film comprising the steps of covering said window with means for generating said subject identifying information, generating a point source of light within said generating means, directing said light down a path which is folded and contains mirrors to direct said light along said path, processing said light to produce an almost collimated light, directing said almost collimated light at the end of said path through LCD means containing a negative display of said subject identifying information located in the path of said light to project an image through said window on said x-ray film which upon being developed will display said information in readable form.

8. The method of claim 7 wherein said LCD means produces upon energization a barcode to be projected onto said X-ray film.

9. The method of claim 8 in which the end of sight light path is located a single lens for directing said light through said LCD means.

10. The method of claim 9 in which said single lens comprises a double convex lens.

11. The method of claim 8 in which a parabolic mirror is utilized to produce said almost collimated light.

* * * * *